United States Patent
Zhu et al.

(10) Patent No.: US 11,733,693 B2
(45) Date of Patent: Aug. 22, 2023

(54) DATA ACQUISITION METHOD AND APPARATUS

(71) Applicant: BEIJING BAIDU NETCOM SCIENCE TECHNOLOGY CO., LTD., Beijing (CN)

(72) Inventors: Houqiang Zhu, Beijing (CN); Pengfei Wei, Beijing (CN); Jia Song, Beijing (CN); Jingang Yan, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 95 days.

(21) Appl. No.: 17/338,979

(22) Filed: Jun. 4, 2021

(65) Prior Publication Data
US 2021/0294320 A1    Sep. 23, 2021

(30) Foreign Application Priority Data

Dec. 18, 2020 (CN) .......................... 202011500117.8

(51) Int. Cl.
*G05D 1/00* (2006.01)
*G05D 1/02* (2020.01)

(52) U.S. Cl.
CPC .......... *G05D 1/0022* (2013.01); *G05D 1/028* (2013.01); *G05D 1/0212* (2013.01); *G05D 1/0285* (2013.01)

(58) Field of Classification Search
CPC .............. G01C 21/343; G01C 21/3815; G01C 21/3826; G01C 21/3837; G01C 21/3841; G01C 7/04; G05D 1/0022; G05D 1/0212; G05D 1/028; G05D 1/0285
See application file for complete search history.

(56) References Cited

U.S. PATENT DOCUMENTS

| | | | | |
|---|---|---|---|---|
| 10,489,972 B2 * | 11/2019 | Atsmon | ............... | G05D 1/0088 |
| 10,789,468 B2 * | 9/2020 | Wang | ........................ | G06K 9/54 |
| 10,796,562 B1 * | 10/2020 | Wild | ..................... | B64C 39/024 |
| 11,106,911 B1 * | 8/2021 | Fathi | ..................... | B64C 39/024 |
| 11,118,916 B2 * | 9/2021 | Gaal | ........................ | H04W 4/40 |
| 2003/0211866 A1 * | 11/2003 | Narazaki | ................ | H04L 67/12 |
| | | | | 455/561 |

(Continued)

FOREIGN PATENT DOCUMENTS

| | | |
|---|---|---|
| CN | 101038559 A | 9/2007 |
| CN | 109684053 A | 4/2019 |

(Continued)

OTHER PUBLICATIONS

First Office Action of the parallel application CN202011500117.8.

*Primary Examiner* — Nicholas Kiswanto
(74) *Attorney, Agent, or Firm* — J.C. Patents

(57) ABSTRACT

The present disclosure discloses a data acquisition method and apparatus, and relates to the field of automatic driving. A specific implementing solution is: obtaining indication information sent by a server, the indication information including: a data type to be acquired during a driving process of a vehicle and at least one acquisition condition triggering an acquisition of data; and according to the indication information, when a state of the vehicle meets any acquisition condition, acquiring first data corresponding to the data type.

14 Claims, 8 Drawing Sheets

(56) References Cited

U.S. PATENT DOCUMENTS

| | | | | |
|---|---|---|---|---|
| 2009/0138188 | A1* | 5/2009 | Kores | G01C 21/32 |
| | | | | 701/117 |
| 2014/0306834 | A1* | 10/2014 | Ricci | G06Q 30/00 |
| | | | | 340/902 |
| 2017/0330391 | A1* | 11/2017 | Uno | H04Q 9/00 |
| 2017/0339056 | A1* | 11/2017 | Uno | H04L 45/74 |
| 2018/0356824 | A1* | 12/2018 | Wang | G01S 7/4808 |
| 2020/0050858 | A1* | 2/2020 | Jung | G06N 3/006 |
| 2020/0074761 | A1* | 3/2020 | Tsuyunashi | G07C 5/0858 |
| 2020/0109954 | A1* | 4/2020 | Li | G05D 1/0274 |
| 2020/0137142 | A1* | 4/2020 | Salles | H04L 67/327 |
| 2020/0226377 | A1* | 7/2020 | Campos Macias | G06K 9/6289 |
| 2020/0327746 | A1* | 10/2020 | Shimizu | G06F 16/2379 |
| 2021/0004021 | A1* | 1/2021 | Zhang | G06T 7/74 |
| 2021/0036767 | A1* | 2/2021 | Devaraj | H04B 7/18515 |
| 2021/0036772 | A1* | 2/2021 | Miranda | H04B 7/18513 |
| 2021/0174197 | A1* | 6/2021 | Georgis | G06N 3/088 |
| 2021/0272389 | A1* | 9/2021 | Prenger | H04L 12/40 |

FOREIGN PATENT DOCUMENTS

| | | |
|---|---|---|
| CN | 109788030 A | 5/2019 |
| CN | 109934954 A | 6/2019 |
| CN | 112087500 A | 12/2020 |

\* cited by examiner

| Data to be acquired | Data format | Data requirement | Recording window | Association information |
|---|---|---|---|---|
| Rainfall sensor output information | Text | (To be determined) | 2.5s after being started | Rainfall size: 0 No rain, 1 Fine drizzling rain, 2 Light rain, 3 Moderate rain, 4 Heavy rain, 5 Torrential rain, 6. the other |
| Wiper spraying water switch status | Text | (To be determined) | Triggering moment | Switch status: 0 Off 1 On |
| Front wiper status | Text | (To be determined) | 1.5s after being triggered | Gear positions: first gear, second gear, third gear |
| System time | Text | 10 HZ | Triggering moment | |
| Automatic driving version | Text | Only once | | |
| Hardware configuration parameters | Text | 1HZ | | |
| Front wide-angle picture | Picture | 10OHZ | | Data information with a rainfall size label and a spraying water switch status label |
| Wheel speed of a left rear wheel | Text | 10HZ | | Data information with a rainfall size label and a spraying water switch status label |
| Wheel speed of a right rear wheel | Text | 5HZ | | Data information with a rainfall size label and a spraying water switch status label |
| Gear position | Text | 100HZ | | Data information with a rainfall size label and a spraying water switch status label |
| IMU | Text | (To be determined) | | Data information with a rainfall size label and a spraying water switch status label |
| Sensed corner information of a parking space | Picture | 10HZ | | Data information with a rainfall size label and a spraying water switch status label |
| Front wide-angle picture | Picture | Sensed a picture before a pre-process Resolution 1280*720 Single frame original image size: 2.78M | | Data information with a rainfall size label and a spraying water switch status label |
| Left fisheye picture | Picture | | | Data information with a rainfall size label and a spraying water switch status label |
| Right fisheye picture | Picture | | 1.5s after being triggered | Data information with a rainfall size label and a spraying water switch status label |
| Front fisheye picture (6) | Picture | | | Data information with a rainfall size label and a spraying water switch status label |
| Front fisheye picture (depth) | Picture | | | Data information with a rainfall size label and a spraying water switch status label |
| Rear fisheye picture | Picture | | | Data information with a rainfall size label and a spraying water switch status label |
| Parking space detection | Picture | 5HZ Post-model picture | | Data information with a rainfall size label and a spraying water switch status label |
| Freespace detection | Picture | | | Data information with a rainfall size label and a spraying water switch status label |
| Depth estimation | Picture | | | Data information with a rainfall size label and a spraying water switch status label |
| Front wide-angle obstacle detection result | Picture | | | Data information with a rainfall size label and a spraying water switch status label |
| EBRCS level log for sensing process | Text | 5HZ | | Data information with a rainfall size label and a spraying water switch status label |
| Front ultrasonic wave | Text | 15HZ | | Data information with a rainfall size label and a spraying water switch status label |
| Rear ultrasonic wave | Text | 25HZ | | Data information with a rainfall size label and a spraying water switch status label |
| Left ultrasonic wave | Text | 25HZ | | Data information with a rainfall size label and a spraying water switch status label |
| Right ultrasonic wave | Text | 25HZ | | Data information with a rainfall size label and a spraying water switch status label |

FIG. 5

DATA ACQUISITION METHOD AND APPARATUS

CROSS-REFERENCE TO RELATED DISCLOSURE

This application claims priority to Chinese Patent Application No. 2020115001178, filed on Dec. 18, 2020, which is hereby incorporated by reference in its entirety.

TECHNICAL FIELD

The present disclosure relates to the field of automatic driving in computer technology and, in particular, to a data acquisition method and apparatus.

BACKGROUND

Driving scene data is a core resource of intelligent automobile products with automatic driving ability, such as unmanned vehicles and assisted driving, thus it is particularly important to acquire driving scene data.

SUMMARY

The present disclosure provides a data acquisition method and apparatus, a device and a storage medium.

According to one aspect of the present disclosure, a data acquisition method is provided and is applied to a vehicle, including:

obtaining indication information sent by a server, the indication information including: a data type to be acquired during a driving process of the vehicle and at least one acquisition condition triggering an acquisition of data corresponding to the data type; and according to the indication information, when a state of the vehicle meets any one of the at least one acquisition condition, acquiring first data corresponding to the data type.

According to another aspect of the present disclosure, a data acquisition method is provided and is applied to a server, including:

sending indication information to a vehicle, the indication information including: a data type to be acquired during a driving process of the vehicle and at least one acquisition condition triggering an acquisition of data corresponding to the data type; and receiving first data acquired by the vehicle according to the indication information, where the first data is data corresponding to the data type.

According to another aspect of the present disclosure, a data acquisition apparatus is provided and is applied to a vehicle, including:

an obtaining module, configured to obtain indication information sent by a server, the indication information including: a data type to be acquired during a driving process of the vehicle and at least one acquisition condition triggering an acquisition of data corresponding to the data type; and an acquiring module, configured to acquire first data corresponding to the data type when a state of the vehicle meets any one of the at least one acquisition condition according to the indication information.

According to another aspect of the present disclosure, a data acquisition apparatus is provided and is applied to a server, including:

a sending module, configured to send indication information to a vehicle, the indication information including: a data type to be acquired during a driving process of the vehicle and at least one acquisition condition triggering an acquisition of data corresponding to the data type; and a receiving module, configured to receive first data acquired by the vehicle according to the indication information, where the first data is data corresponding to the data type.

According to another aspect of the present disclosure, a system for data acquisition is provided, including a vehicle and a server, where the vehicle is used to execute the method described above on a vehicle side and the server is used to execute the method described above on a server side.

According to another aspect of the present disclosure, an electronic device is provided, including:

at least one processor; and a memory communicatively connected to the at least one processor; where, the memory stores an instruction executable by the at least one processor which, when executed by the at least one processor, enable the at least one processor to execute the method described above on a vehicle side or the method described above on a server side.

According to another aspect of the present disclosure, a non-transitory computer readable storage medium storing a computer instruction is provided, where the computer instruction is used to enable a computer to execute the method described above on a vehicle side or the method described above on a server side.

According to another aspect of the present disclosure, a computer program product is provided, the program product including: a computer program, the computer program being stored in a readable storage medium, wherein at least one processor of an electronic device can read the computer program from the readable storage medium, and the at least one processor executes the computer program to enable the electronic device to execute the method described above on a vehicle side or the method described above on a server side.

According to technologies of the present disclosure, needed driving scene data can be acquired flexibly and efficiently, thereby effectively improving efficiency of the data acquisition.

It should be understood that what is described in the present section is not intended to identify key or important features of embodiments in the present disclosure, nor is it intended to limit scope of the present disclosure. Other features of the present disclosure will become easily understood from following description.

BRIEF DESCRIPTION OF DRAWINGS

The drawings are for better understanding of the present solution and do not constitute a limitation of the present disclosure. Where:

FIG. 5 is a schematic diagram of configuration information of data to be acquired provided by an embodiment of the present disclosure;

DESCRIPTION OF EMBODIMENTS

Figure 1:
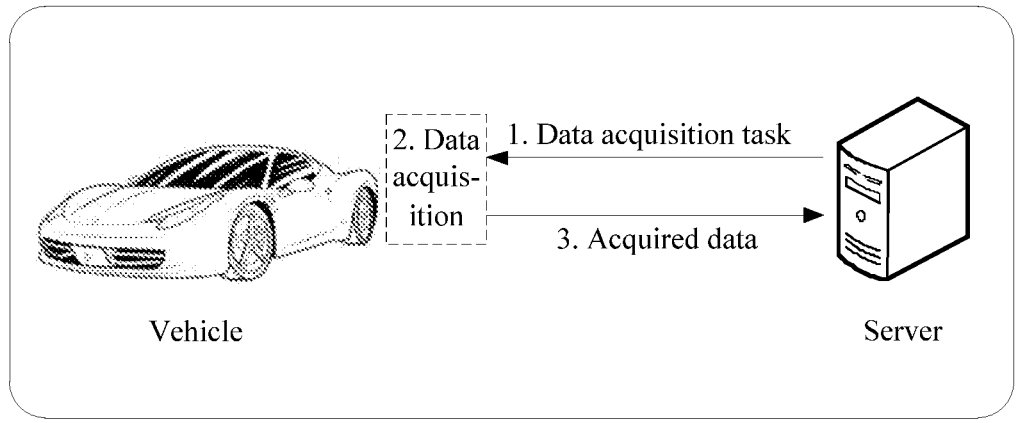
FIG. 1 is a schematic diagram of a data acquisition system provided by an embodiment of the present disclosure.

Exemplary embodiments of the present disclosure are described below in conjunction with the drawings, where various details of the embodiments of the present disclosure are included to facilitate understanding, which should be considered as merely exemplary. Therefore, it should be recognized by persons of ordinary skilled in the art that various changes and modifications can be made to the embodiments described herein without departing from scope and spirit of the present disclosure. Similarly, for the sake of clarity and conciseness, descriptions of well-known functions and structures are omitted in the following description.

In order to better understand technical solutions of the present disclosure, firstly, background technology related to the present disclosure is further explained in detail:

driving scene data is a core resource of intelligent automobile products with automatic driving ability, such as unmanned vehicles and assisted driving. In a process of product development, driving scene data is widely used in a main process such as model training and performance testing. Where quality of driving scene data, richness of coverage scenes, and amount of data directly determine a level of the automatic driving ability, thus acquisition of the driving scene data has become a core working link in research and development of automatic driving technology.

At present, when acquiring driving data with related technologies, a professional data acquisition vehicle is usually used to acquire data in various types of road scenes. However, there is a large number of driving scene data to be acquired and the road scenes are complicated, thus it is necessary to design numerous road scenes and acquire data for a long time through the acquisition vehicle.

Therefore, acquiring data according to the acquisition vehicle may lead to lower efficiency of data acquisition.

Due to complexity and infinity of an automatic driving scene, new problems that are not considered by a current technology will constantly emerge in a process of model training and product use, thus it is urgent to quickly acquire corresponding data based on a problem scene for technical optimization.

However, a conventional driving data acquisition is mostly carried out in batches in an early stage of research and development. When a new problems arises, it is necessary to organize a full data acquisition again to deal with new problems, which will lead to high cost and a long cycle, and pace of data acquisition cannot keep up with speed of new problems; and a lot of problems come from a limited ability of data acquisition, thus it is difficult to make up for lack of data caused by some extreme working conditions that are difficult to cover by conventional methods such as outing for real acquisition, screening open source data sets, and strengthening data merely by an acquisition vehicle.

The following describes several possible implementations of acquiring driving scene data in the prior art:

(1) using an acquisition vehicle equipped with professional devices to acquire data under various road scenes.

In this way, data acquisition accuracy is high and acquisition content is comprehensive, however, purchasing and assembly cost of the acquisition vehicle is extremely high. Usually, an institution that needs to acquire data has a limited number of the acquisition vehicle, thus it needs to allocate according to demand, resulting in low acquisition efficiency.

(2) obtaining data from professional data suppliers.

In this way, a large number of designated and labeled data may be obtained quickly. However, model network structures and training frameworks used by various data users are quite different, and data forms of data suppliers may not completely match training requirements. Therefore, after obtaining data from data suppliers, a developer needs to perform complicated data cleaning and screening on the data. And cost of obtaining data from the data suppliers is high, and content of the obtained data is limited by abilities of the data suppliers.

(3) screening from a public data set.

This method has low cost and short cycle, and may meet requirements of multi-class model suspension chain for common automatic driving. However, due to poor pertinence, it is difficult to solve new problem scenes by the data screened in a public data set, and an open source of the public data has not considered and acquired data for the new problem scenes. In addition, there are a large number of repeated scenes in the public data set, and there is few high-value data to solve a specific problem, thus it is necessary to select a label from jumbled data piles, which leads to a complicated data processing flow. Therefore, data requirements that this method can meet are limited.

(4) simulation based on partial acquisition.

This technology can quickly and massively construct target scene data for repeated training and testing of models, which is a technical means used by many scientific and technological institutions to replace actual acquisition data. However, there are differences between simulated data and real road data in terms of types, conditions, elements, etc., and it is difficult to fully restore diversity of the real world by machine simulation.

(5) data crowdsourcing acquisition.

Crowdsourcing a data acquisition task to an institution with its own fleet, or a third-party organization equipped with sensors on operating vehicles, or directly producing on-board devices with data acquisition capability for users to acquire real driving data during a daily operation of a large number of fleets.

This method can solve deficiency of diversity and extensiveness of the first four types of data acquisition modes, however, because of limitations that cooperation channels are limited and use and attribution of data are restricted by partners, flexibility of deployment and disclosure of acquisition work is extremely poor.

In conclusion, implementation solutions of the prior art cannot meet huge demand of rapid development of automatic driving technology and traffic for data, and a data acquisition party needs to spend a lot of time and cost on basic data acquisition work, resulting in that technical capacity cannot be fully released; and diversity of acquired data cannot be guaranteed in the data acquisition solutions in the prior art, which leads to lack of comprehensiveness of acquired driving scene data. In some extreme cases, a data acquisition cannot even be implemented, which leads to shortcomings in model training.

Therefore, iteration of autonomous driving technology requires efficient and comprehensive automatic driving data acquisition with controllable cost.

Based on this, the present disclosure provides following technical consideration: by constructing a complete data link between a data cloud and a user's vehicle, a data acquisition task is configured in the cloud, then the data acquisition task is sent to the vehicle for data acquisition, and then acquired data is returned to the cloud for storage, so that it can be applied to mass production vehicles. In a daily real driving scene of the majority of users, a task-based automatic driving data self-acquisition system which automatically acquires data according to research and development needs can ensure rapid, large, and accurate automatic data acquisition.

Data acquisition methods provided by the present disclosure will be explained with specific embodiments. First, a data acquisition system provided by the present disclosure will be introduced in conjunction with FIG. 1, and FIG. 1 is a schematic diagram of the data acquisition system provided by an embodiment of the present disclosure.

As shown in FIG. 1, the system includes a vehicle and a server.

Where front sensor hardware such as a multi-channel camera and ultrasonic radar may be installed in the vehicle, thus the vehicle in the present embodiment has data acquisition capability. In addition, the server in the present embodiment may construct a data acquisition task and issue the data acquisition task to the vehicle, and the server can also receive and store data acquired by the vehicle.

In the present embodiment, the vehicle may communicate with the server, where a specific communication mode between the vehicle and the server may be selected according to actual needs as long as it can realize interaction of data and information. In a possible implementation, the vehicle in the present embodiment may be understood as a vehicle, and the server in the present embodiment may be understood as a cloud.

Where a data acquisition process can be shown, for example, in FIG. 1, and referring to FIG. 1, the server may construct the data acquisition task, where the data acquisition task may include, for example, a data type to be acquired, a data acquisition condition, acquisition priorities, weight values, and other information. A specific implementation of the data acquisition task is not particularly limited in the present embodiment.

After that, the server may send the data acquisition task to the vehicle, and the vehicle may acquire data according to the data acquisition task. After data acquisition is completed, the acquired data may be returned to the server, then the server may store the data, and then can carry out model training, performance testing, and other processes according to the data.

Based on the above introduction, it can be determined that the data acquisition method provided by the present disclosure can automatically acquire required data based on the data acquisition task issued by the server, so as to effectively ensure efficiency and comprehensiveness of data acquisition. The data acquisition method provided by the present disclosure will be explained with specific embodiments below.

Figure 2:
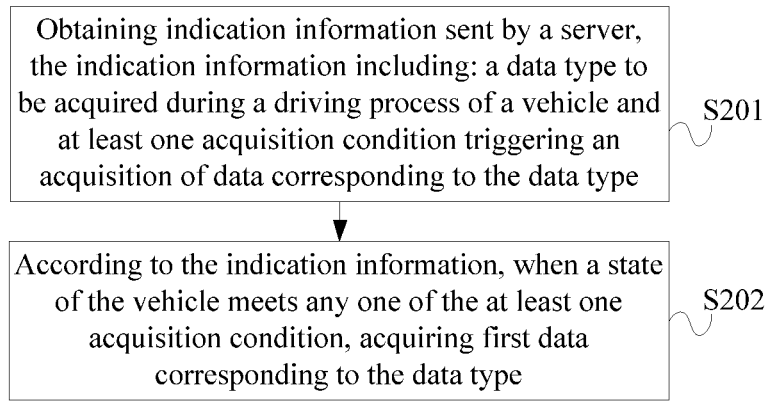
FIG. 2 is a flowchart of a data acquisition method provided by an embodiment of the present disclosure.

FIG. 2 is a flowchart of a data acquisition method provided by an embodiment of the present disclosure. As shown in FIG. 2, the method includes:

S201, obtaining indication information sent by a server, the indication information including: a data type to be acquired during a driving process of a vehicle and at least one acquisition condition triggering an acquisition of data corresponding to the data type.

In the present embodiment, the vehicle may obtain the indication information sent by the server, where the indication information is used to indicate the vehicle to acquire data.

Where the vehicle, for example, may periodically send request information to the server to obtain the indication information sent by the server; or the vehicle may also receive the indication information sent by the server, so as to obtain the indication information sent by the server. That is to say, the vehicle may actively obtain the indication information from the server or passively receive the indication information from the server, which is not limited by the present embodiment as long as it can obtain the indication information from the server.

In a possible implementation, the indication information may include the data type to be acquired during the driving process of the vehicle, and the at least one acquisition condition triggering the acquisition of the data corresponding to the data type.

Where the type of data to be acquired means what data need to be acquired at present, and the acquisition condition means under what circumstances the data corresponding to the data type should be acquired. For example, the types of data to be acquired in the indication information include: wiper spraying water switch status, gear position, left rear wheel speed, and right rear wheel speed, and the at least one acquisition condition triggering acquiring data includes that: after detecting that a wiper is started and continuously running for 10 seconds, "spraying water to glass" starts.

That is to say, after the vehicle detects that the wiper is started and continuously running for 10 seconds, if it is detected that the "spraying water to glass" is turned on, the wiper spraying water switch status, the gear position, the left rear wheel speed, and the right rear wheel speed are acquired.

In an actual implementation process, a specific data type to be acquired and a specific acquisition condition may be selected according to actual requirements, which is not limited in the present embodiment. And the indication information may include a plurality of acquisition conditions, and no matter which acquisition condition is met, the vehicle may be triggered to acquire data.

In addition, the indication information in the present embodiment may also include any content related to data acquisition, such as acquisition duration, data uploading times of each of data content, data uploading frequency of each of the data content, label information, and the like.

Where the acquisition time may be, for example, several duration before and after a start of a triggering point set according to data use requirements. In addition, acquisition parameters of each of data acquisition content may be set according to requirements, so as to determine uploading times and uploading frequencies of each of data content. In addition, the label information is added when each acquisition task is created, and attached to data format after the data acquisition for subsequent data classification management and use.

In the present embodiment, there is no particular limitation on a specific implementation of content included in the indication information, and any information that can be used to indicate data acquisition may be used as the indication information in the present embodiment.

S202, according to the indication information, when a state of the vehicle meets any one of the at least one acquisition condition, acquiring first data corresponding to the data type.

After receiving the indication information, the vehicle may acquire driving scene data according to the indication information, where the vehicle may judge whether the vehicle state meets an acquisition condition according to the at least one acquisition condition in the indication information.

In a possible implementation, when the state of the vehicle meets any acquisition condition, the vehicle may acquire data, specifically, it may acquire the first data corresponding to the data type to be acquired indicated in the indication information.

Where, for example, each acquisition condition corresponds to a same data type to be acquired, that is to say, no matter which acquisition condition is met at present, the data corresponding to the data type to be acquired included in the indication information is acquired, so as to obtain the first data.

Or, each acquisition condition corresponds to its own data type to be acquired, for example, currently there are acquisition condition 1 and acquisition condition 2, where a data type to be acquired corresponding to the acquisition condition 1 is data type A and a data type to be acquired corresponding to acquisition condition 2 is data type B. When the vehicle state meets acquisition condition 1, data corresponding to data type A is acquired, so as to obtain the first data.

In the present embodiment, types of data to be acquired corresponding to various acquisition conditions are not particularly limited, and the first data in the present embodiment is data acquired and obtained by the vehicle when a corresponding acquisition condition is met.

It can be understood that the first data is the driving scene data mentioned above, where the first data may be, for example, state data of the vehicle, or surrounding environment data of the vehicle. In the present embodiment, a specific implementation of the first data is not particularly limited, but depends on a type of data to be acquired indicated in the indication information.

In a possible implementation, after completing acquisition of the first data, the vehicle may send the first data to the server, thus realizing flexible and efficient acquisition of the driving scene data according to actual demands.

Or, the vehicle may also save acquired first data locally and send it to the server according to a preset cycle, or it may also send it to the server according to an instruction of the server. In the present embodiment, an implementation of post-processing the acquired first data is not particularly limited.

In this process, when faced with some new problem scenarios, corresponding indication information may be configured, so that data acquisition can be targeted to ensure flexibility of the data acquisition, and a specific implementation of the data acquisition is completed by the vehicle end so that data acquisition can be realized during an operation of the vehicle, thus effectively ensuring the efficiency of the data acquisition and reducing cost of the data acquisition.

The data acquisition method provided by the embodiment of the present disclosure includes: acquiring indication information sent by a server, where the indication information includes a type of data to be acquired during a driving process of a vehicle and at least one acquisition condition triggering acquisition of the data. According to the indication information, when a state of the vehicle meets any acquisition condition, first data corresponding to the data type is acquired. By obtaining the indication information for indicating data acquisition from the server, later, acquiring corresponding driving scene data during the driving process of the vehicle according to the indication information, needed driving scene data can be acquired flexibly and efficiently, thereby effectively improving efficiency of the data acquisition.

Figure 3:
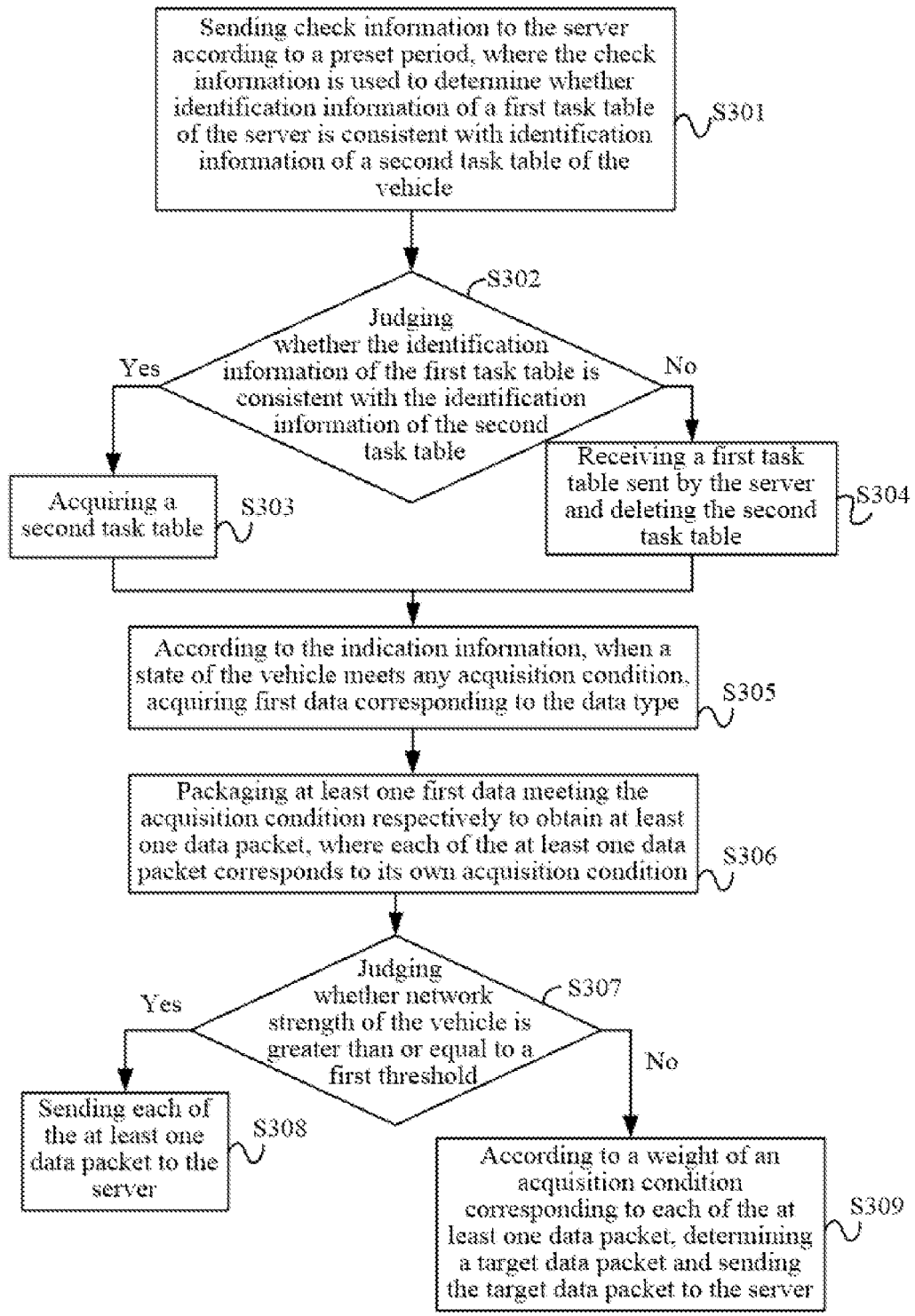
FIG. 3 is a second flowchart of a data acquisition method provided by an embodiment of the present disclosure.
Figure 4:
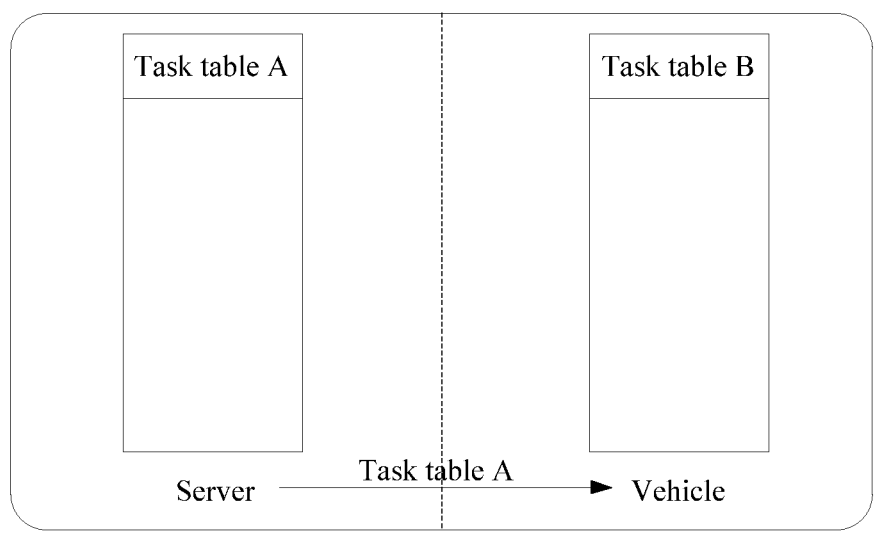
FIG. 4 is a schematic diagram of an implementation of obtaining a task table provided by an embodiment of the present disclosure.
Figure 6:
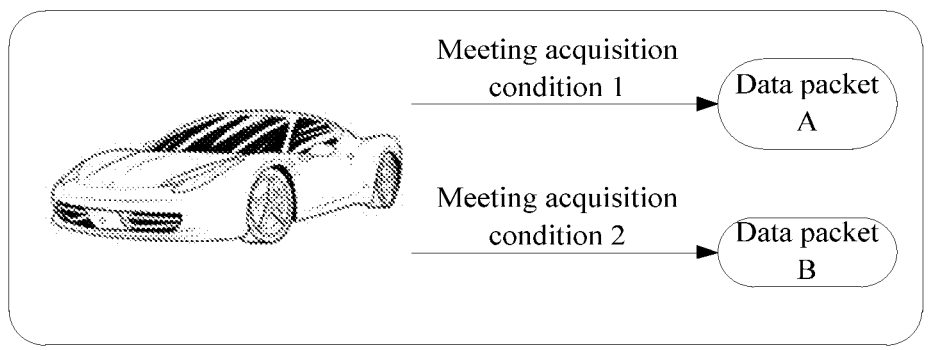
FIG. 6 is a schematic diagram of determining a data packet of acquired data provided by an embodiment of the present disclosure.
Figure 7:
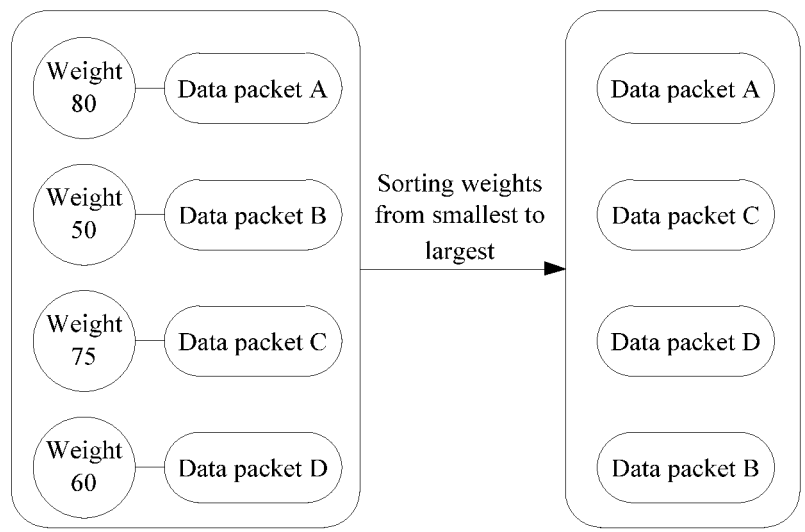
FIG. 7 is a schematic diagram of sorting various data packets provided by an embodiment of the present disclosure.

On the basis of the above embodiments, the data acquisition method provided by the present disclosure is further described in detail with a specific embodiment, and is described in conjunction with FIGS. 3 to 7. FIG. 3 is a second flowchart of a data acquisition method provided by an embodiment of the present disclosure; FIG. 4 is a schematic diagram of an implementation of obtaining a task table provided by an embodiment of the present disclosure; FIG. 5 is a schematic diagram of configuration information of data to be acquired provided by an embodiment of the present disclosure; FIG. 6 is a schematic diagram of determining a data packet of acquired data provided by an embodiment of the present disclosure; and FIG. 7 is a schematic diagram of sorting various data packets provided by an embodiment of the present disclosure.

As shown in FIG. 3, the method includes:

S301, sending check information to the server according to a preset period, where the check information is used to determine whether identification information of a first task table of the server is consistent with identification information of a second task table of the vehicle.

In the present embodiment, after the server determines the indication information, the indication information may be distributed to the vehicle in a form of a task table, where the task table includes various contents of the indication information.

In a possible implementation, the indication information may include at least one of the following information:

task attribution: a vehicle series, a vehicle type, and a software version at a vehicle end that performs a specified task.

Task execution cycle: setting start and end time of a task, and the task will be automatically voided when the end time is reached.

Task weight: setting a weight according to importance of an acquisition task, which is used to determine a priority of subsequent data transmission and storage.

Acquisition content: including basic data such as time, status, a software version, and a hardware parameter, data of sensor, such as a cameras, ultrasonic radar, and millimeter wave radar, vehicle body information such as a gear position, wheel speed, and lamp status, and automatic driving module data, state machine data, system log data, etc.

Acquisition condition: based on need of data acquisition, a triggering condition for the data acquisition should be configured, and a triggering source, triggering time, triggering acquisition duration, etc. should be specified to directionally acquire data of a vehicle body and surrounding environment in a specified scene.

In an actual implementation process, a specific implementation of each piece of information included in the indication information may be selected according to actual needs, which is not limited in the present embodiment. Besides the information introduced above, the indication information may also include any information for indicating data acquisition, and a specific implementation of the indication information is not particularly limited by the present embodiment.

Therefore, the indication information of the present embodiment may be stored in a task table, where the task table has corresponding identification information, and the vehicle may obtain a latest task table from the server according to the identification information of the task table.

For example, a first task table is included in the server and a second task table is included in the vehicle. It can be understood that the second task table in the vehicle is also acquired from the server and then stored in the vehicle, which may be understood as an old task table.

In order to obtain the latest task table, in a possible implementation, the vehicle periodically establishes a connection with the server, so as to send check information to the server according to a preset period, where the check information is used to determine whether identification information in the first task table is consistent with identification information in the second task table.

Where the preset period for the vehicle to send the check information may be selected according to actual demands, which is not limited in the present embodiment. In addition, identification information of a task table may also be selected according to actual needs, which may be, for example, a number, or a character, or a combination of numbers and characters. In the present embodiment, an implementation of identification information of a task table is not particularly limited, as long as a piece of identification information can be used to uniquely indicate a task table.

In a possible implementation, the task table may also, for example, have attribute information, and the attribute information of the task table includes at least one of the following: vehicle information corresponding to the task table, executing time corresponding to the task table, and a weight value corresponding to at least one data acquisition task in the task table, and the weight value is used to indicate upload or storage priority of acquired data corresponding to each data acquisition task.

For example, composition of a task table may be seen in table 1 below.

TABLE 1

Task table

| | |
|---|---|
| ID: | Being composed of vehicle end software version + date and time |
| Attributes: | Brand-vehicle series-vehicle model-vehicle end version |
| Composition: | At least one data acquisition task |
| Status: | Generated/tested/failed/released/voided |

Where an identity document (ID) of a task table is used to uniquely identify a task table. In a possible implementation, the ID of the task table may be composed of a vehicle software version+date and time.

Or in other possible implementations, the ID of the task table may also be numbers, letters, combinations of numbers and letters, etc. In the present embodiment, a specific implementation of the ID of the task table is not limited, and it may be selected according to actual needs.

The following is an exemplary description of an implementation process of constructing a task table according to attribute information and data acquisition tasks in the present embodiment:

creating task table: selecting a distributed vehicle brand, a vehicle series, a vehicle model, and a software version, and specifying a vehicle end where a task is executed.

Task selection: selecting a data acquisition task to be executed by a qualified vehicle, where the data acquisition task may be a task indicated by the above indication information, for example, one acquisition condition may correspond to one data acquisition task. The data acquisition task may create a configuration in advance for selection and use when creating a task table.

Weight setting: configuring a corresponding weight for each data acquisition task, so as to determine a priority of storage and transmission sequence after data acquisition is completed. The weight setting here and the weight corresponding to the acquisition condition introduced in the above embodiments may be, for example, a same concept.

Task cycle setting: setting a date range of executing a task, where the vehicle acquires data of a corresponding scene in a cycle, and after an end date is reached, the task is automatically voided.

Based on the above Table 1, it can be determined that a task table may have a plurality of states. In a possible implementation, a task table may be released after the task table is completed, and the task table may be in a released state after release is completed. After full release, a task will be distributed to all vehicles of a vehicle type to which the task belongs, and a task may be released to vehicles of some vehicle types in small batches through a vehicle identification number (VIN). VIN information may be manually entered or uploaded in batches using a specified file.

Where the specified file may be, for example, a file in xml format, or it may be a file in any format as long as the VIN information can be indicated, which is not particularly limited in the present embodiment.

In addition, in another possible implementation, a task table in a "released" state may also be voided manually within a set running time range. After the task table is voided, the vehicle that has received the task table will stop acquiring data until receiving other new tasks.

S302: judging whether the identification information of the first task table is consistent with the identification information of the second task table, if yes, executing S303; otherwise, executing S304.

Where the vehicle may judge whether the identification information of the first task table is consistent with the identification information of the second task table according to the check information.

S303: acquiring a second task table.

In a possible implementation, if determining that the identification information of the first task table and the identification information of the second task table are consistent, the vehicle may determine that the second task table included in a current vehicle is the latest task table, and the vehicle may directly acquire the locally stored second task table and acquire vehicle driving data according to the second task table.

It can be understood that the second task table is also obtained from the server before.

S304: receiving a first task table sent by the server and deleting the second task table.

In another possible implementation, if the determining that the identification information of the first task table is inconsistent with the identification information of the second task table, the vehicle may determine that there is a new task table in a current server, and then the vehicle may obtain the first task table of the server.

For example, it can be understood with reference to FIG. 4, for example, a task table A is currently included in the server and a task table B is included in the vehicle. If the vehicle can determine that the task table in the server is inconsistent with the task table in the vehicle by sending check information to the server, the vehicle may receive the task table B sent by the server and execute a corresponding data acquisition task according to the task table B.

And in order to execute the data acquisition task indicated by the new task table, the vehicle may also delete the locally stored second task table and store the newly acquired first task table locally.

It can also be understood that after the acquired first task table is stored locally in the vehicle, the first task table becomes the second task table described above. In a next preset cycle, it will be determined whether identification information of a task table in the server and identification information of the task table currently stored in the vehicle end is consistent.

In addition, in a possible implementation, based on the above description, it can be determined that a data acquisition task may correspond to a vehicle series, a vehicle model and a vehicle end software version for executing the specified task. Therefore, in the present embodiment, before receiving the first task table sent by the server, the vehicle end may firstly judge whether the vehicle series, the vehicle model, and the vehicle end software version are consistent with a vehicle series, a vehicle model, and a vehicle end software version corresponding to the first task table, if so, then receive the first task table; if not, continue to acquire data according to a local second task table.

In other possible implementations, when acquiring the first task table of the server fails, such as unsuccessful communication between the vehicle and the server, failed task table downloading, failed or damaged task table parsing, damaged local task table and other abnormal task table acquisition, an operation of acquiring the first task table of the server may be repeatedly executed until the first task table of the server is successfully acquired, or until a number of repeated executions reaches a preset number.

When the number of repeated execution reaches the preset number, but acquisition of the first task table has not been successful, data acquisition will continue according to the second task table stored locally, and if there is no task table stored locally, the data acquisition will not be carried out.

That is to say, when the vehicle fails to acquire the task table from the server, it may repeat the operation for a specified number of times. If acquisition for the specified number of times is unsuccessful, data acquisition will continue according to an old task table locally of the vehicle, and if there is no task table in the vehicle, no data acquisition will be carried out.

S305, according to the indication information, when a state of the vehicle meets any acquisition condition, acquiring first data corresponding to the data type.

Where an implementation of S305 is similar to that of S202, and in the present embodiment, after the server completes a configuration of the indication information, it may issue the indication information to the vehicle in a form of a task table, thus the vehicle may acquire data according to the task table.

Taking data acquisition in rainy day scene as an example, a possible implementation of task table will be explained below:

rainy day scene have great interference to vehicle sensors, which easily leads to misjudgment of automatic driving algorithm when an amount of training data is insufficient in rainy days. However, acquisition of rainy day data is limited by weather and region. In the present embodiment, based on a specific rainy day data acquisition requirement, a corresponding data acquisition strategy may be configured in the server, so as to determine the indication information, and then send the indication information to vehicles in various regions, so that the vehicles in various regions trigger an acquisition action in rainy days, and automatically complete acquisition and uploading of corresponding data.

Where a part of a task table in a rainy day scene may be, for example, shown in FIG. 5, and in FIG. 5, relevant information of data to be acquired is exemplarily introduced.

With reference to FIG. 5, it is assumed that current data to be acquired may include rainfall sensor output information, wiper spraying water switch status, front wiper status in described in FIG. 5, etc. It is worth noting that IMU in FIG. 5 is an inertial measurement unit, freespace is a driving area of an automobile, and "ERROR" level log for sensing interior refers to level log of sensing the interior of a vehicle as abnormal. An implementation of other data to be acquired may refer to an introduction in FIG. 5, which will not be repeated here.

At the same time, referring to FIG. 5, it can be determined that a data format, a data requirement, a recording window, and annotation information of each data to be acquired may be indicated in a task table.

Where the data format refers to which data format that is used to perform data acquisition currently, the data demand refers to which frequency that is used to perform the data acquisition, the record window refers to when to acquire data, and the annotation information refers to annotation information carried by current acquired data, so as to facilitate subsequent data storage and search.

Taking "system time" in FIG. 5 as an example, the data format thereof may be text, and data needs to be acquired once at 10 Hz, and the recording window is to acquire at trigger time without annotation information. As for the data of "system time", it means that the system time is acquired at a frequency of 10 Hz from time when the acquisition condition is triggered, and acquired data is text.

Implementations of other data to be acquired are similar, and the annotation information is explained in conjunction with annotation information of "Rainfall Sensor Output Information". For example, the "Rainfall Sensor Output Information" has seven states. In order to facilitate data storage, the seven states of the "Rainfall Sensor Output Information" may be labeled with 7 numbers which are 0 to 6, and a specific corresponding relationship thereof may refer to descriptions in FIG. 5.

In addition, referring to annotation information of "left rear wheel speed" in FIG. 5, it can be determined that the annotation information of the "left rear wheel speed" is data information with a rainfall size label and a spraying water switch status. Here, by way of example, it can be determined that acquisition frequency of the "left rear wheel speed" is 100 Hz, for example, when currently acquiring the "left rear wheel speed", a corresponding rainfall size is "2", that is, light rain, and a state of a corresponding spraying water switch is "0", that is, off, which means that current acquisition of "left rear wheel speed" is acquired under a condition of light rain and that a wiper is not spraying water.

Therefore, annotation information of a plurality of data to be acquired in FIG. 5 is "data information with a rainfall size label and a spraying water switch status", which means that label information of these data is a rainfall size label and a spraying water switch status label when acquiring current data.

FIG. 5 refers to a plurality of data to be acquired, which will not be described here. For specific implementation, please refer to the above exemplary description and the schematic diagram of FIG. 5.

The task table described above in conjunction with FIG. 5 is relevant indication information of data to be acquired, and in a possible implementation, the task table may also include an acquisition condition, where a setting of the acquisition condition may be that, for example:

a wiper status is acquired at a frequency of 3 Hz, and after a wiper is detected to start and run continuously for 10 seconds, and when "spraying water to glass" starts or rainfall sensor data judges that rainfall>0, data acquisition is triggered.

Specifically, it may include following two acquisition conditions:

acquisition condition 1: corresponding to a real rainy scene.

After the wiper starts and runs continuously for 10 seconds, it is determined that the rainfall is greater than 0 according to information of a rainfall sensor.

When the acquisition condition is met, acquisition of each data introduced in the above FIG. 5 may be triggered. Based on the above introduction, it can be determined that each acquisition condition may correspond to its own weight. For example, a weight of a current acquisition condition is set to 80, which is a medium priority acquisition scene.

In addition, if the scene reaches a triggering condition several times a day, it will be triggered by the same rainfall for the first time, and only a rainfall gear larger than previous acquisition conditions is acquired for different rainfall. For example, when the rainfall is equal to 3, it will only be triggered once, and then only when the rainfall is greater than 3, a trigger acquisition condition will be determined.

Acquisition condition 2: corresponding to a scene of cleaning glass by spraying water.

After the wiper starts and runs continuously for 10 seconds, it is determined that switch information is ON according to information of a switch of spraying water to glass, and then it is determined as a scene triggering for cleaning a front windshield.

When the acquisition condition is met, the acquisition of each data described in the above FIG. 5 may be triggered, and a weight of the current acquisition condition may be, for example, set to 50, which is a low priority acquisition scene.

This scene is triggered only when the triggering condition is reached for the first time each day.

At the same time, based on the acquisition conditions introduced above, the following two scenes may also be determined:

user's misoperation: after the wiper starts and runs continuously for 10 seconds, if the "spraying water to glass" does not start and the rainfall sensor shows that the rainfall is 0, it is classified as a user's misoperation behavior, which does not trigger data acquisition.

Other scenes: in case the user triggers the wiper to clean other objects and liquids actively or for other needs, it is still judged whether to trigger the acquisition condition according to the above strategies, so as to determine whether to acquire data.

The above is an introduction of data acquisition taking a rainy scene as an example. In an actual implementation process, data content needed to be acquired, a data requirement, a data acquisition condition, and a weight corresponding to each acquisition condition may be selected according to the actual demand, so that corresponding data can be acquired according to actual data demands.

During a running process of the vehicle, it polls whether the trigger condition is met according to a continuously synchronized triggering source status. When a trigger source such as vehicle body status information, perceptual information, environment information, and position/time information reach a combination condition configured by the server, data acquisition in a corresponding scene is automatically triggered. This process does not need manual supervision, and all acquisition conditions that meet a configuration of the server may arouse a vehicle's self-acquisition of required data.

S306: packaging at least one first data meeting the acquisition condition respectively to obtain at least one data packet, where each of the at least one data packet corresponds to its own acquisition condition.

In the present embodiment, when it is determined that a state of the vehicle meets any the acquisition condition, acquisition of specified data will be triggered, where each acquisition condition corresponds to its own weight. Therefore, in order to facilitate transmission and storage of subsequent data, acquired first data corresponding to each acquisition condition may be packaged respectively to obtain at least one data packet, where each data packet corresponds to its own acquisition condition.

In conjunction with FIG. 6, it is assumed that currently there are two acquisition conditions which are acquisition condition 1 and acquisition condition 2, where when the state of the vehicle meets acquisition condition 1, the vehicle triggers data acquisition according to the indication information, and packages acquired first data corresponding to acquisition condition 1 to obtain a data packet A, where the data packet A is a data packet corresponding to the acquisition condition 1.

In addition, when the state of the vehicle meets the acquisition condition 2, the vehicle triggers data acquisition according to the indication information, and packages acquired first data corresponding to the acquisition condition 2 to obtain a data packet B, where the data packet B is a data packet corresponding to the acquisition condition 2.

S307: judging whether network strength of the vehicle is greater than or equal to a first threshold, if yes, executing S308; otherwise, executing S309.

After data acquisition is completed and at least one data packet is obtained, it is necessary to upload the data packet to the server. During data transmission, a network condition has a great influence, thus it can be judged whether a current network condition of the vehicle is good at first.

In a possible implementation, it can be judged whether the network strength of the vehicle is greater than or equal to the first threshold value, so as to determine whether the network condition is good, where a setting of the first threshold value may be selected according to actual needs, which is not limited in the present embodiment.

In an actual implementation process, determining whether the network condition is good may also be judged according to other factors, for example, a throughput rate and a packet loss rate of a network. An implementation of determining whether the network condition is good is not limited by the present embodiment, which may be selected according to actual needs, and any parameter used to indicate a network state may be used as a judging condition for determining whether the network condition is good in the present embodiment.

S308, sending each data packet to the server.

In a possible implementation, if it is determined that the network strength of the vehicle is greater than or equal to the first threshold, it may be determined that a current network condition is good. In this case, acquired data may be uploaded to a cloud in real time. Specifically, each data packet may be sent to the server.

S309, according to a weight of an acquisition condition corresponding to each data packet, determining a target data packet and sending the target data packet to the server.

In another possible implementation, if it is determined that the network strength of the vehicle is less than the first threshold, it may be determined that the current network condition is not good, and the vehicle may travel to a weak network, or a vehicle network is occupied by other functions, and then data with a higher weight may be preferentially returned, thus ensuring that data with higher priority can be uploaded to the server firstly.

For example, according to the weight of the acquisition condition corresponding to each data packet, each data packet may be sorted in an order from the largest weight to the smallest weight.

Where each data packet corresponds to an acquisition condition and each acquisition condition corresponds to its own weight, and then a vehicle end may sort each data packet according to the weight of the acquisition condition corresponding to each data packet, where the sorting mode may be, for example, in a sequence from a high weight to a low weight.

For example, it can be understood by referring to FIG. 7, that assuming that currently there are data packets A, B, C, and D, where a weight of data packet A is 80; a weight of data packet B is 50; a weight of data packet C is 75; and a weight of data packet D is 60. According to an order of weights from large to small, data packets sorted as shown in FIG. 7 may be obtained in following order: the data packet A, the data packet C, the data packet D, and the data packet B.

After that, a preset number of data packets sorted in front are determined as target data packets, and the target data packets are sent to a server cloud.

Where after each data packet is sorted, in a possible implementation, the preset number of data packets sorted in front may be determined as target data packets, where the target data packets are data packets with higher priority. And the vehicle may send the target data packets to the server, so that data with higher priority can be preferentially returned to the server.

For example, refer to an example in FIG. 7, where a preset number may be 2, then top 2 data packets, i.e., the data packet A and the data packet C, may be determined as the target data packets, so that the data packets A and C with larger weights may be preferentially sent to the server. Where a specific setting of the preset number may be selected according to actual needs, which is not particularly limited in the present embodiment.

In another possible implementation, the vehicle, for example, may also determine a data packet whose weight value is greater than or equal to a preset threshold as the target data packet. Also, taking the example of FIG. 7 as an example, assuming that the preset threshold is 80, it can be determined that only the data packet A among the four data packets in FIG. 7 meets a condition, and then the data packet A is determined as the target data packet and then sent to the server.

In another possible implementation, when setting the weight corresponding to each acquisition condition, for example, an uploading mode of the data packet corresponding to each acquisition condition may be set.

The acquisition conditions 1 and 2 in a rainy scene described above are taken as an example for illustration.

For a data packet corresponding to the acquisition condition 1, it corresponds to a data packet of a real rainy sub-scene, and the above description shows that a corresponding weight thereof is 80. Then, for example, the data packet corresponding to the acquisition condition 1 may be set to be preferentially returned in real time, cached when the network state is not good, preferentially returned when the network condition permits, and cannot be covered.

For a data packet corresponding to the acquisition condition 2, it corresponds to a data packet of a "spraying water to clean glass" sub-scene, and the above description shows that a corresponding weight thereof is 50. Then, for example, the data packet corresponding to the acquisition condition 2 may be set to be cached acquiescently, and an coverage operation will be performed after being compared with other cached data, and the data packet will be uniformly returned after being powered on in the evening of a same day.

In the present embodiment, an implementation of determining a specific data packet to be returned under a condition of poor network condition is not limited, as long as it can ensure that a data packet with a higher weight is returned preferentially.

In addition, after the target data packet with a larger weight is returned, remaining data packets except the target data packet among the currently acquired data packets may be stored in the vehicle, and the remaining data packets may be sent to the server when a network signal is good, for example, when the network strength is greater than or equal to the first threshold.

When saving the remaining data packets in the vehicle, it is also necessary to consider whether storage space of the vehicle is enough to store the remaining data packets.

In a possible implementation, if the storage space of the vehicle is enough to store the remaining data packets, the remaining data packets may be stored in the vehicle.

In another possible implementation, if the storage space of the vehicle is not enough to store the remaining data packets, data coverage operation needs to be performed according to weight set in a task management stage and in combination with a limited memory condition in the vehicle. Where data with a low weight and acquisition time which is far away now may be covered according to the weight and acquisition time sequence corresponding to each data packet, so as to ensure that high-value data with a high weight and latest acquisition time may be stored and returned.

Specifically, the second data packet whose weight is smaller than those of the remaining data packets and/or whose generation time is earlier than those of the remaining data packets may be acquired from the data packets currently stored in the vehicle, and then the remaining data packets are saved in the vehicle to cover the second data packet.

Where in an implementation of determining the second data packet, for example, there may be a plurality of remaining data packets and a plurality of data packets currently stored in the vehicle. For example, data packet with a weight less than the minimum weight among the remaining data packets may be determined as the second data packet, or the data packet with a weight less than that of any one of the remaining data packets may also be determined as the second data packet, which is not limited by the present embodiment and may be selected according to actual needs.

By using data with a high weight and latest acquisition time, and covering data with a low weight and acquisition time which is far away from now, it can effectively ensure that the high weight and fresh data can be returned preferentially, thereby effectively ensuring efficiency and effectiveness of data transmission.

The above describes sending data packets to the server. In a possible implementation of sending the data packets to the server, each data packet may be compressed and encrypted respectively, and each data packet may be sent to the server in a breakpoint resume mode, thereby effectively ensuring security and integrity of the data transmission.

The data acquisition method provided by the embodiment of the present disclosure includes: sending check information to the server according to a preset period, where the check information is used to determine whether identification information of a first task table of the server is consistent with identification information of a second task table of the vehicle; and judging whether the identification information of the first task table is consistent with the identification information of the second task table, if so, obtaining the second task table, if not, receiving a first task table sent by the server and deleting the second task table; according to the indication information, when a state of the vehicle meets any acquisition condition, acquiring first data corresponding to the data type; packaging at least one first data meeting the acquisition condition respectively to obtain at least one data packet, where each data packet corresponds to its own acquisition condition; judging whether network strength of the vehicle is greater than or equal to a first threshold, if so, sending each data packet to the server, and if not, according to a weight of an acquisition condition corresponding to each data packet, determining a target data packet and sending the target data packet to the server.

By specifying a weight corresponding to each acquisition task, data with a larger weight may be preferentially returned to the server in a process of data return and storage, so that efficiency and effectiveness of data acquisition can be effectively guaranteed. At the same time, for data not returned in time, data with higher priority may be saved locally, and then the data saved locally in the vehicle may be returned to the server when the network condition is good, thereby effectively ensuring integrity and comprehensiveness of acquired data.

Figure 8:
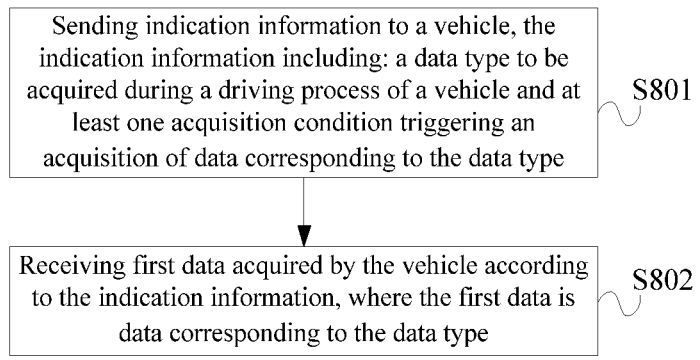
FIG. 8 is a third flowchart of a data acquisition method provided by an embodiment of the present disclosure.

The above embodiments introduce the implementations of data acquisition at a vehicle end, and an implementation of a cloud is described below in conjunction with FIG. 8. FIG. 8 is a third flowchart of a data acquisition method provided by an embodiment of the present disclosure.

As shown in FIG. 8, the method includes:

S801, sending indication information to a vehicle, the indication information including: a data type to be acquired during a driving process of a vehicle and at least one acquisition condition triggering an acquisition of data corresponding to the data type.

In a possible implementation, the indication information may be determined in real time in the server, or the indication information may be preset. An implementation of the indication information is similar to that described above, which will not be repeated here.

After determining the indication information, the server may send the indication information to the vehicle. In a possible implementation, for example, the indication information may be sent to the vehicle in a form of a task table, the implementation thereof is similar to that described above.

In addition, referring to the above introduction, it can be determined that the vehicle may send check information to the server according to a preset period, and for the server, the server may receive the check information sent by the vehicle according to the preset period, where the check information is used to determine whether identification information of a first task table of the server is consistent with identification information of a second task table of the vehicle.

In a possible implementation, if the identification information of the first task table is inconsistent with the identification information of the second task table, the server may send the first task table to the vehicle, so that the vehicle can acquire data according to the first task table.

In addition, the indication information may also include a weight corresponding to each acquisition condition, where the weight corresponding to each acquisition condition is used to indicate upload priority and storage priority of data corresponding to each acquisition condition.

Its implementation is similar to the embodiments described above on a vehicle side, which will not be repeated here.

S802, receiving first data acquired by the vehicle according to the indication information, where the first data is data corresponding to the data type.

After completing data acquisition, the vehicle may send the first data to the server, and then the server may receive the first data acquired by the vehicle according to the indication information, where the first data is the data corresponding to the data type in the indication information.

After receiving the first data sent by the vehicle, the server needs to save the first data. In a possible implementation, the server may download and receive the data returned by the vehicle at a breakpoint, and then use a cold and hot storage mechanism of a hierarchical server to store it on the disk after decrypting the data.

Where the server may classify and store the first data according to label information of each first data.

Specifically, the server may automatically perform classification according to the label information such as a task attribute label, a vehicle end software version, acquisition time, etc., generated during a data acquisition process, and then quickly screen and find target data later, so as to optimize working efficiency of a cloud database.

In addition, the server may also display data stored in the database in visual form, so that a developer can check scene information online, summarize and download it, and put it into automatic driving model training and testing, etc.

Classified storage of the first data is also described below by taking a rainy scene described above as an example.

For example, if the above-mentioned data acquisition scene is a rainy scene, a primary label of all the acquired data may be "rainy scene", and the above-mentioned rainy scene is subdivided into a scene of real rain corresponding to acquisition condition 1 and a scene of spraying water to clean glass corresponding to acquisition condition 2.

Then a secondary label corresponding to the first data corresponding to the acquisition condition 1 may be the "real rain", and a secondary label corresponding to the first data corresponding to the acquisition condition 2 may be "spraying water to clean glass".

Or, according to the software version, the acquisition time, and so on, a third label, a fourth label, etc. may be set, so as to realize classified storage of data. When it is necessary to search for data, label information or all data under the label may be directly followed.

In a process of using data, taking the rainy scene introduced above as an example, in a possible implementation, after data quantity is accumulated to meet use quantity, a developer may download the data and put it into algorithm training and simulation test in rainy environment. If effect of updating a model is desirable, an acquisition task in a wiper scene ends, and if the effect is still not good, the task will continue to run to expand data.

The data acquisition method provided by the embodiment of the present disclosure includes: sending indication information to a vehicle, where the indication information includes a data type to be acquired during a driving process of the vehicle and at least one acquisition condition for triggering acquisition of data corresponding to the data type; and receiving first data acquired by the vehicle according to the indication information, where the first data is the data corresponding to the data type. The server sends the indication information to a vehicle end, so that the vehicle end can acquire required data according to the indication information, which can effectively improve flexibility and efficiency of data acquisition. At the same time, in the present embodiment, first data can be classified and stored according to label information of received first data, thus effectively improving data search efficiency in a subsequent data use process.

Figure 9:
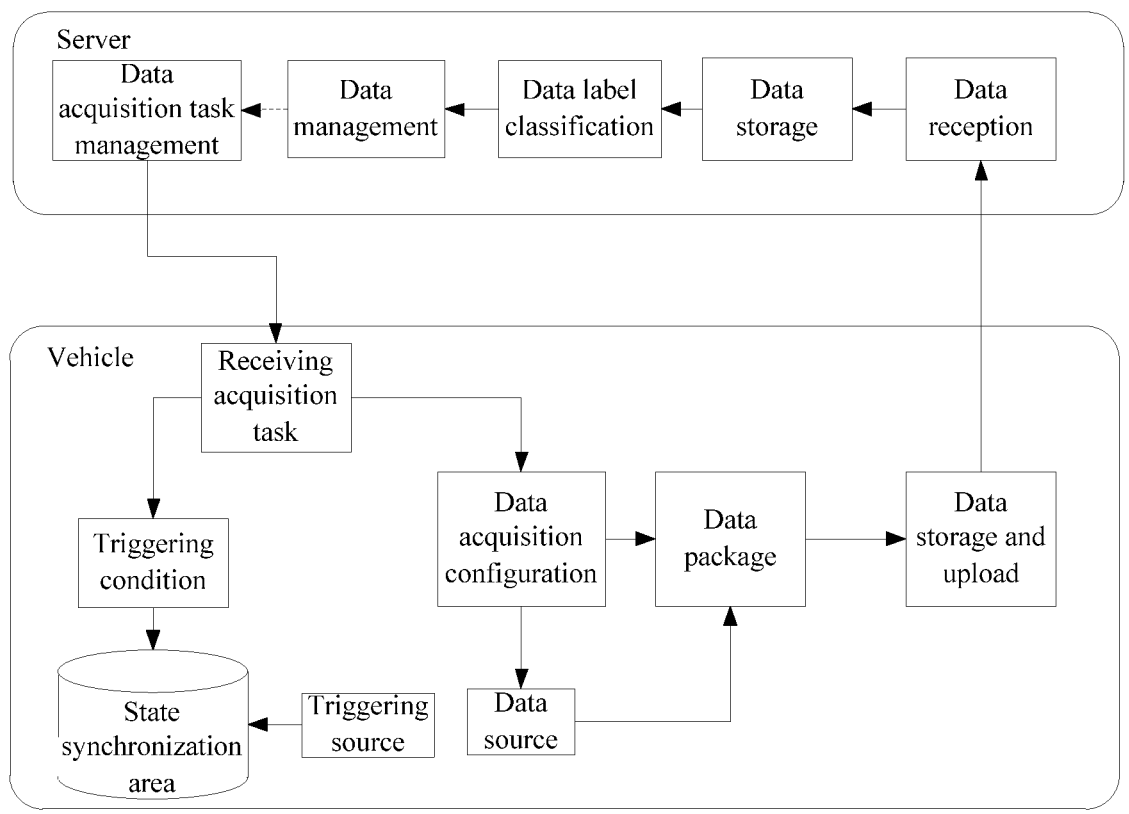
FIG. 9 is a flow diagram of a data acquisition method provided by an embodiment of the present disclosure.

On the basis of the above embodiments, work flows of the vehicle and the cloud in the embodiments of the present disclosure will be systematically introduced in conjunction with FIG. 9. And FIG. 9 is a flow diagram of a data acquisition method provided by an embodiment of the present disclosure.

As shown in FIG. 9, a system may include four functional units: cloud task management, vehicle end data acquisition, vehicle end data transmission, and cloud data processing, which work in the cloud and the vehicle end respectively, that is, they are the server and the vehicle shown in FIG. 9.

Where after data demands are generated, indication information may be configured in a data acquisition task management unit of the server, and after the indication information is determined, the server may send the indication information to the vehicle in a form of a task table.

After that, the vehicle acquires data according to a data acquisition task indicated in the task table, where the vehicle may determine whether a triggering source triggers an acquisition condition in a state synchronization area according to the acquisition condition and a vehicle state in the task table, and a specific acquisition condition setting may be selected according to actual demands, which will not be described here.

When determining that the acquisition condition is triggered, the vehicle acquires data according to relevant configuration information of data acquisition to obtain a data source, where the relevant configuration information of the data acquisition may be, for example, the data format, the data acquisition frequency, etc. introduced in the above embodiments, which will not be described in detail here.

After the data acquisition is completed and the data source is obtained, the vehicle end may package data respectively according to various acquisition conditions, and upload a data packet with a larger weight to the server preferentially according to a respective weight corresponding to each acquisition condition, where the vehicle may upload the data to the server through a gateway and a TelematicsBOX (T-box).

For a server that cannot be uploaded in real time, the data may also be saved on the vehicle side according to the weight, and then uploaded to the server when a network condition is better.

After receiving the data acquired by the vehicle end according to the indication information, the server may store the data and classify and store the data according to label information of the data. An implementation thereof may refer to the above embodiments, which will not be described here.

And the server may also manage the data, for example, when the data acquisition is completed, according to a request of data call, relevant data may be searched for model training, performance testing, and other disclosures. If it is determined that the data acquisition is not completed, the data acquisition may be continued.

Based on the above description, it can be determined that communication will take place between the vehicle end and the cloud.

In conclusion, the data acquisition method provided by the embodiment of the present disclosure ensures flexibility of data acquisition in a form that a task is configured and deployed in a cloud by constructing an interconnected data link between the cloud and a vehicle end, effectively controls pertinence of data content through task execution based on a triggering condition at the vehicle end, and improves diversity of data scenes by virtue of task execution of mass production vehicles in daily driving. In addition, data acquisition cost under an operation mode of this system is extremely low, and timeliness of data acquisition is greatly improved with uninterrupted operations of a large user fleet.

The present disclosure provides a data acquisition method and apparatus, which are applied to the field of automatic driving in computer technology to achieve effect of improving efficiency of data acquisition.

Figure 10:
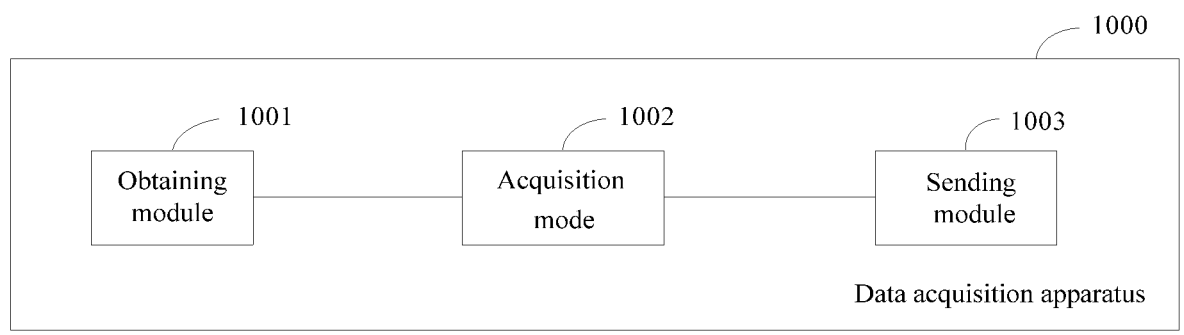
FIG. 10 is a schematic structural diagram of a data acquisition apparatus in an embodiment of the present disclosure, which is applied to a vehicle.

FIG. 10 is a schematic structural diagram of a data acquisition apparatus in an embodiment of the present disclosure, which is applied to a vehicle. As shown in FIG. 10, a data acquisition apparatus 1000 of the present embodiment may include: an obtaining module 1001, an acquiring module 1002, and a sending module 1003.

The obtaining module 1001 is configured to obtain indication information sent by a server, where the indication information includes: a data type to be acquired during a driving process of the vehicle and at least one acquisition condition triggering an acquisition of data corresponding to the data type.

The acquiring module 1002 is configured to acquire first data corresponding to the data type when a state of the vehicle meets any the acquisition condition according to the indication information.

In a possible implementation, the indication information is stored in a task table, and the task table has corresponding identification information.

The acquiring module 1001 includes:

a checking unit, configured to send check information to the server according to a preset period, where the check information is used to determine whether identification information of a first task table of the server is consistent with identification information of a second task table of the vehicle;

a task table determining unit, configured to receive the first task table sent by the server and delete the second task table if the identification information of the first task table is inconsistent with the identification information of the second task table; or, the task table determining unit is further configured to acquire the second task table if the identification information of the first task table is consistent with the identification information of the second task table.

In a possible implementation, the indication information further includes a weight corresponding to each acquisition condition.

In a possible implementation, the data acquisition apparatus 1000 further includes: a sending module 1003; and the sending module 1003 includes:

a packaging unit, configured to package at least one first data meeting the acquisition condition respectively to obtain at least one data packet, where each of the at least one data packet corresponds to its own acquisition condition;

a sending unit, configured to send each of the at least one data packet to the server if network strength of the vehicle is greater than or equal to a first threshold; and the sending unit is further configured to determine a target data packet according to the weight of the acquisition condition corresponding to each of the at least one data packet and send the target data packet to the server if the network strength of the vehicle is less than the first threshold.

In a possible implementation, the sending module 1003 is further configured to:

save remaining data packets except the target data packet of the data packet in the vehicle, and send the remaining data packets to the server when the network strength is greater than or equal to the first threshold.

Where the sending module 1003 includes:

a storage unit, configured to store the remaining data packets in the vehicle if storage space of the vehicle is sufficient to store the remaining data packets; and the storage unit is further configured to, if the storage space of the vehicle is not enough to store the remaining data packets, obtain a second data packet whose weight is smaller than those of the remaining data packets and/or whose generation time is earlier than those of the remaining data packets from data packets currently stored in the vehicle, store the remaining data packets in the vehicle and cover the second data packet.

In a possible implementation, the obtaining module 1001 is further configured to:

if the first task table of the server fails to be obtained, repeatedly execute an operation of obtaining the first task table of the server until the first task table of the server is successfully obtained, or until repeated execution times reach a preset number.

In a possible implementation, the acquiring module 1002 is further configured to:

if the repeated execution times reach the preset number, carry out data acquisition according to the second task table.

Figure 11:
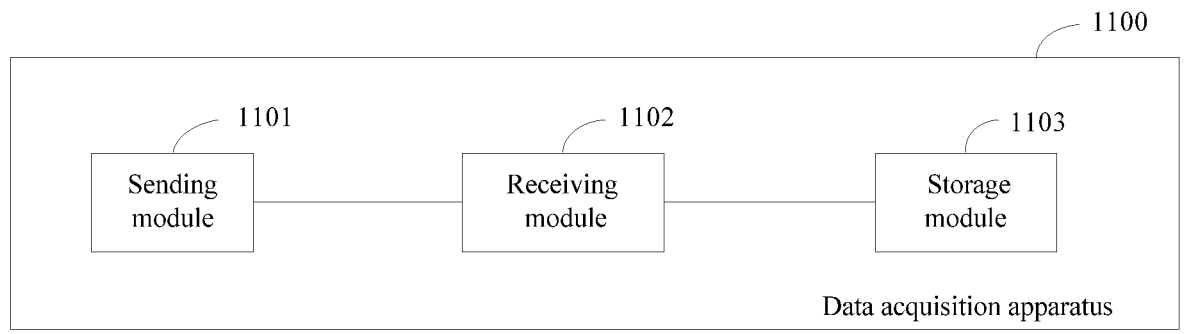
FIG. 11 is a schematic structural diagram of a data acquisition apparatus in another embodiment of the present disclosure, which is applied to a server.

FIG. 11 is a schematic structural diagram of a data acquisition apparatus in another embodiment of the present disclosure, which is applied to a server. As shown in FIG. 11, the data acquisition apparatus 1100 of the present embodiment may include a sending module 1101 and a receiving module 1102.

The sending module 1101 is configured to send indication information to a vehicle, the indication information including: a data type to be acquired during a driving process of the vehicle and at least one acquisition condition triggering an acquisition of data corresponding to the data type; and the receiving module 1102 is configured to receive first data acquired by the vehicle according to the indication information, where the first data is data corresponding to the data type.

In a possible implementation, the indication information is stored in a task table, and the task table has corresponding identification information;

the sending module 1102 includes:

a receiving unit, configured to receive check information sent by the vehicle according to a preset period, where the check information is used to determine whether identification information of a first task table of the server is consistent with identification information of a second task table of the vehicle; and a sending unit, configured to send the first task table to the vehicle if the identification information of the first task table is inconsistent with the identification information of the second task table.

In a possible implementation, the indication information further includes: a weight corresponding to each the acquisition condition, where the weight corresponding to each acquisition condition is used to indicate upload priority and storage priority of data corresponding to each acquisition condition.

In a possible implementation, the data acquisition apparatus 1100 further includes a storage module 1103; and the storage module 1103 is configured to classify and store the first data according to label information of each of the first data.

According to embodiments of the present disclosure, the present disclosure further provides an electronic device and a readable storage medium.

According to an embodiment of the present disclosure, the present disclosure further provides a computer program product, where the program product includes: a computer program, the computer program is stored in a readable storage medium; at least one processor of an electronic device may read the computer program from the readable storage medium; and the at least one processor executes the computer program to enable the electronic device to execute solution provided by any embodiment described above.

Figure 12:
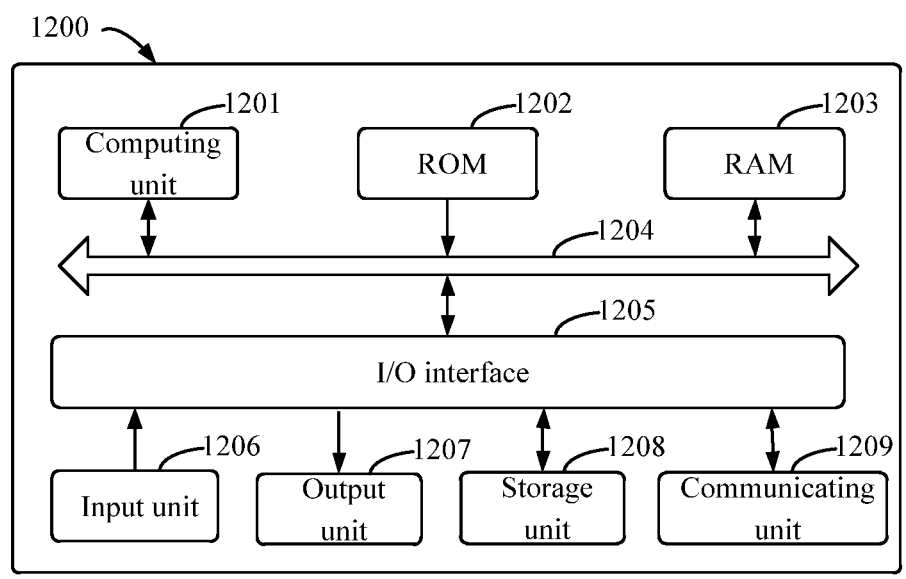
FIG. 12 is a block diagram of an electronic device for implementing a data acquisition method in an embodiment of the present disclosure.

FIG. 12 shows a schematic block diagram of an exemplary electronic device 1200 that can be used to implement embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may also represent various forms of mobile apparatuses, such as a personal digital assistant, a cellular phone, a smart phone, a wearable device, and other similar computing apparatuses. Components shown herein, their connections and relationships, and their functions are merely examples, which are not intended to limit implementations of the present disclosure described and/or claimed herein.

As shown in FIG. 12, the electronic device 1200 includes a computing unit 1201, which may perform various appropriate actions and processes according to a computer program stored in a read only memory (ROM) 1202 or a computer program loaded from a storage unit 1208 to a random access memory (RAM) 1203. In the RAM 1203, various programs and data required for an operation of the device 1200 may also be stored. The computing unit 1201, the ROM 1202, and the RAM 1203 are connected to each other through a bus 1204. Input/output (I/O) interface 1205 is also connected to the bus 1204.

A plurality of components in the device 1200 are connected to the I/O interface 1205, which includes: an input unit 1206, such as a keyboard and a mouse; an output unit 1207, such as various types of displays and speakers; a storage unit 1208, such as a magnetic disk and an optical disk; and a communicating unit 1209, such as a network card, a modem, and a wireless communication transceiver. The communicating unit 1209 allows the device 1200 to exchange information/data with other devices through a computer network such as the Internet and/or various telecommunication networks.

The computing unit 1201 may be various general-purpose and/or special-purpose processing components with processing and computing capabilities. Some examples of the computing unit 1201 include, but are not limited to, a central processing unit (CPU), a graphics processing unit (GPU), various dedicated artificial intelligence (AI) computing chips, various computing units running machine learning model algorithms, a digital signal processor (DSP), and any appropriate processor, controller, microcontroller, etc. The computing unit 1201 performs various methods and processes described above, such as a data acquisition method. For example, in some embodiments, the data acquisition method may be implemented as a computer software program tangibly embodied in a machine-readable medium, such as the storage unit 1208. In some embodiments, part or the entire computer program may be loaded and/or installed on the device 1200 via the ROM 1202 and/or the communicating unit 1209. When the computer program is loaded into the RAM 1203 and executed by the computing unit 1201, one or more steps of the data acquisition method described above may be performed. Alternatively, in other embodiments, the computing unit 1201 may be configured to perform the data acquisition method by any other appropriate means (for example, by means of firmware).

According to an embodiment of the present disclosure, the present disclosure further provides a computer program product which includes a computer program, which, when executed by a processor, implements various methods and processes described above, such as the data acquisition method.

Various embodiments of systems and techniques described above herein may be implemented in a digital electronic circuit system, an integrated circuit system, a field programmable gate array (FPGA), an disclosure specific integrated circuit (ASIC), an disclosure specific standard product (ASSP), a system on a chip (SOC), a complex programmable logic device (CPLD), computer hardware, firmware, software, and/or combinations thereof. These various embodiments may include: being implemented in one or more computer programs that may be executed and/or interpreted on a programmable system including at least one programmable processor which may be a special-purpose or general-purpose programmable processor and may receive data and instructions from and transmit the data and the instructions to a storage system, at least one input apparatus, and at least one output apparatus.

Program codes for implementing the method of the present disclosure may be written in any combination of one or more programming languages. These program codes may be provided to a processor or a controller of a general-purpose computer, a special-purpose computer, or other programmable data processing apparatus, so that the program codes, when executed by the processor or the controller, enables functions/operations specified in a flowchart and/or a block diagram to be implemented. The program codes may be executed completely on the machine, partially on the machine, partially on the machine as an independent software package, and partially on a remote machine or completely on a remote machine or server.

In the context of the present disclosure, a machine-readable medium may be a tangible medium that may contain or store a program for use by or in conjunction with an instruction execution system, apparatus or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any appropriate combination of the above. More specific examples of the machine readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination of the above.

To provide interactions with a user, the systems and techniques described herein may be implemented on a computer having: a display apparatus (e.g., a CRT (cathode ray tube) or LCD (liquid crystal display) monitor) for displaying information to the user; and a keyboard and a pointing apparatus (e.g., a mouse or a trackball) through which the user may provide input to the computer. Other kinds of apparatuses may also be used to provide interactions with users; for example, a feedback provided to the user may be any form of sensory feedback (for example, a visual feedback, an auditory feedback, or a tactile feedback); and input from the user may be received in any form (including acoustic input, voice input, or tactile input).

The systems and techniques described herein may be implemented in a computing system including background components (e.g., as a data server), a computing system including middleware components (e.g., an disclosure server), or a computing system including front-end components (e.g., a user computer with a graphical user interface or a web browser through which a user may interact with implementations of the systems and techniques described herein), or a computing system including any combination of such background components, middleware components, or front-end components. Components of the systems may be connected to each other through a digital data communication in any form or medium (e.g., communication network). An example of a communication network includes: a local area network (LAN), a wide area network (WAN), and the Internet.

A computer system may include a client and a server. The client and the server are generally remote from each other and usually interact through a communication network. A relationship between the client and the server is generated by a computer program running on a corresponding computer and having a client-server relationship with each other. The server may be a cloud server, also known as a cloud computing server or a cloud host, which is a host product in a cloud computing service system to solve defects of difficult management and weak traffic scalability in a conventional physical host and a VPS service (Virtual Private Server or VPS for short). The server may also be a server of a distributed system or a server combined with a blockchain.

According to the technical solutions of the embodiment of the present disclosure, by obtaining indication information for indicating data acquisition from a server, then acquiring corresponding driving scene data according to the indication information during a driving process of a vehicle, and sending acquired driving scene data to the server, the required driving scene data can be acquired flexibly and efficiently, and efficiency of data acquisition can be effectively improved.

It should be understood that steps may be reordered, added or deleted using various forms of flows shown above. For example, steps described in the present disclosure may be executed in parallel, sequentially, or in a different order, as long as a desired result of the technical solutions disclosed in the present disclosure can be achieved, which is not limited herein.

The above specific implementations do not limit protection scope of the present disclosure. It should be understood by persons skilled in the art that various modifications, combinations, subcombinations, and substitutions may be made according to design requirements and other factors. Any modification, equivalent substitution, and improvement made within spirit and principle of the present disclosure shall be included in the protection scope of the present disclosure.

What is claimed is:

1. A data acquisition method applied to a vehicle, the method comprising:
    obtaining, by a processor of the vehicle, indication information sent by a server, the indication information comprising: a data type to be acquired during a driving process of the vehicle and at least one acquisition condition triggering an acquisition of data corresponding to the data type; and
    according to the indication information, when a state of the vehicle meets any one of the at least one acquisition condition, automatically acquiring, by the processor of the vehicle, first data corresponding to the data type;
    wherein the indication information is stored in a task table, and the task table has corresponding identification information; and
    the obtaining, by the processor of the vehicle, indication information sent by a server comprises:
    sending, by the processor of the vehicle, check information to the server according to a preset period, wherein the check information is used to determine whether identification information of a first task table of the server is consistent with identification information of a second task table of the vehicle acquired from the server and then stored in the vehicle, wherein the first task table is a latest task table;
    when the identification information of the first task table is inconsistent with the identification information of the second task table, obtaining, by the processor of the vehicle, the first task table sent by the server,
    when the first task table of the server is obtained successfully, deleting, by the processor of the vehicle, the second task table, and
    when the first task table of the server fails to be obtained, repeatedly executing, by the processor of the vehicle, an operation of obtaining the first task table of the server, and when the repeated execution times reach a preset number and the first task table of the server still fails to be obtained, executing, by the processor of the vehicle, data acquisition according to the second task table;
    wherein the first task table and the second task table both comprises at least one data acquisition task;
    wherein the indication information further comprises: a weight corresponding to each of the at least one acquisition condition;
    the method further comprises:
    packaging, by the processor of the vehicle, at least one first data meeting the acquisition condition respectively to obtain at least one data packet, wherein each of the at least one data packet corresponds to its own acquisition condition;
    when network strength of the vehicle is greater than or equal to a first threshold, sending, by the processor of the vehicle, each of the at least one data packet to the server; and
    when the network strength of the vehicle is less than the first threshold, determining, by the processor of the vehicle, a target data packet according to the weight of the acquisition condition corresponding to each of the at least one data packet and sending, by the processor of the vehicle, the target data packet to the server.

2. The method according to claim 1, wherein the first task table and the second task table both further comprises attribute information and status information.

3. The method according to claim 1, further comprising:
    saving remaining data packets except the target data packet of the data packet in the vehicle, and sending the remaining data packets to the server when the network strength is greater than or equal to the first threshold;
    wherein the saving remaining data packets except the target data packet of the data packet in the vehicle comprises:
    when storage space of the vehicle is sufficient to store the remaining data packets, saving the remaining data packets in the vehicle; and
    when the storage space of the vehicle is not enough to store the remaining data packets, obtaining a second data packet whose weight is smaller than those of the remaining data packets and/or whose generation time is earlier than those of the remaining data packets from data packets currently stored in the vehicle, storing the remaining data packets in the vehicle and covering the second data packet.

4. A data acquisition method applied to a server, the method comprising:
    sending indication information to a vehicle, the indication information comprising: a data type to be acquired during a driving process of the vehicle and at least one acquisition condition triggering an acquisition of data corresponding to the data type; and
    receiving first data automatically acquired by the vehicle according to the indication information, wherein the first data is data corresponding to the data type;
    wherein the indication information is stored in a task table, and the task table has corresponding identification information; and
    the sending indication information to a vehicle comprises:
    receiving check information sent by the vehicle according to a preset period, wherein the check information is used to determine whether identification information of a first task table of the server is consistent with identification information of a second task table of the vehicle, wherein the first task table is a latest task table; and
    wherein when the identification information of the first task table is inconsistent with the identification information of the second task table, sending the first task table to the vehicle;
    wherein the first task table and the second task table both comprises at least one data acquisition task;
    wherein the indication information further comprises: a weight corresponding to each of the at least one acquisition condition;

wherein at least one data packet is obtained by the vehicle through packaging at least one first data meeting the acquisition condition respectively, and each of the at least one data packet corresponds to its own acquisition condition;

when network strength of the vehicle is greater than or equal to a first threshold, receiving each of the at least one data packet from the vehicle; and when the network strength of the vehicle is less than the first threshold, receiving the target data packet from the vehicle, wherein the target data packet is determined by the vehicle according to the weight of the acquisition condition corresponding to each of the at least one data packet.

5. The method according to claim 4, wherein the first task table and the second task table both further comprises attribute information and status information.

6. The method according to claim 4, wherein the weight corresponding to each of the at least one acquisition condition is used to indicate upload priority and storage priority of data corresponding to each of the at least one acquisition condition.

7. The method according to claim 4, further comprising: according to label information of each of the first data, classifying and storing the first data.

8. A data acquisition system, comprising: a vehicle and a server, wherein the vehicle is configured to:
obtain indication information sent by the server, the indication information comprising: a data type to be acquired during a driving process of the vehicle and at least one acquisition condition triggering an acquisition of data corresponding to the data type, and
according to the indication information, when a state of the vehicle meets any one of the at least one acquisition condition, automatically acquire first data corresponding to the data type;
wherein the indication information is stored in a task table, and the task table has corresponding identification information;
the vehicle is further configured to:
send check information to the server according to a preset period, wherein the check information is used to determine whether identification information of a first task table of the server is consistent with identification information of a second task table of the vehicle acquired from the server and then stored in the vehicle, wherein the first task table is a latest task table;
when the identification information of the first task table is inconsistent with the identification information of the second task table, obtain the first task table sent by the server,
when the first task table of the server is obtained successfully, delete the second task table, and
when the first task table of the server fails to be obtained, repeatedly execute an operation of obtaining the first task table of the server, and when the repeated execution times reach a preset number and the first task table of the server still fails to be obtained, execute data acquisition according to the second task table;
wherein the first task table and the second task table both comprises at least one data acquisition task; and
wherein the indication information further comprises: a weight corresponding to each of the at least one acquisition condition;
the vehicle is further configured to:
package at least one first data meeting the acquisition condition respectively to obtain at least one data packet, wherein each of the at least one data packet corresponds to its own acquisition condition;
when network strength of the vehicle is greater than or equal to a first threshold, send each of the at least one data packet to the server; and
when the network strength of the vehicle is less than the first threshold, determine a target data packet according to the weight of the acquisition condition corresponding to each of the at least one data packet and send the target data packet to the server;
the server is configured to execute the method according to claim 4.

9. A data acquisition apparatus applied to a vehicle, the apparatus comprising:
at least one processor;
a communication interface connected to the at least one processor; and
a memory communicatively connected to the at least one processor; wherein,
the memory stores instructions executable by the at least one processor which, when executed by the at least one processor, enable the at least one processor to execute the method according to claim 1.

10. The apparatus according to claim 9, wherein the first task table and the second task table both further comprises attribute information and status information.

11. The apparatus according to claim 9, wherein the at least one processor is further enabled to:
save remaining data packets except the target data packet of the data packet in the vehicle, and send the remaining data packets to the server when the network strength is greater than or equal to the first threshold;
store the remaining data packets in the vehicle when storage space of the vehicle is sufficient to store the remaining data packets; and
when the storage space of the vehicle is not enough to store the remaining data packets, obtain a second data packet whose weight is smaller than those of the remaining data packets and/or whose generation time is earlier than those of the remaining data packets from data packets currently stored in the vehicle, store the remaining data packets in the vehicle and cover the second data packet.

12. A data acquisition apparatus applied to a server, the apparatus comprising:
at least one processor;
a communication interface connected to the at least one processor; and
a memory communicatively connected to the at least one processor; wherein,
the memory stores instructions executable by the at least one processor which, when executed by the at least one processor, enable the at least one processor to execute the method according to claim 4.

13. A non-transitory computer readable storage medium, storing a computer instruction for enabling a computer to:
obtain, by a processor of the vehicle, indication information sent by a server, the indication information comprising: a data type to be acquired during a driving process of the vehicle and at least one acquisition condition triggering an acquisition of data corresponding to the data type; and
according to the indication information, when a state of the vehicle meets any one of the at least one acquisition condition, automatically acquire, by the processor of the vehicle, first data corresponding to the data type;

wherein the indication information is stored in a task table, and the task table has corresponding identification information; and the computer is further enabled to:

send, by the processor of the vehicle, check information to the server according to a preset period, wherein the check information is used to determine whether identification information of a first task table of the server is consistent with identification information of a second task table of the vehicle acquired from the server and then stored in the vehicle, wherein the first task table is a latest task table;

when the identification information of the first task table is inconsistent with the identification information of the second task table, obtain, by the processor of the vehicle, the first task table sent by the server, when the first task table of the server is obtained successfully, delete, by the processor of the vehicle, the second task table, and when the first task table of the server fails to be obtained, repeatedly execute, by the processor of the vehicle, an operation of obtaining the first task table of the server, and when the repeated execution times reach a preset number and the first task table of the server still fails to be obtained, execute, by the processor of the vehicle, data acquisition according to the second task table;

wherein the first task table and the second task table both comprises at least one data acquisition task;

wherein the indication information further comprises: a weight corresponding to each of the at least one acquisition condition;

the computer is further enabled to:

package, by the processor of the vehicle, at least one first data meeting the acquisition condition respectively to obtain at least one data packet, wherein each of the at least one data packet corresponds to its own acquisition condition;

when network strength of the vehicle is greater than or equal to a first threshold, send, by the processor of the vehicle, each of the at least one data packet to the server;

when the network strength of the vehicle is less than the first threshold, determine, by the processor of the vehicle, a target data packet according to the weight of the acquisition condition corresponding to each of the at least one data packet and send, by the processor of the vehicle, the target data packet to the server.

14. A non-transitory computer readable storage medium, storing a computer instruction for enabling a computer to:

send, by a server, indication information to a vehicle, the indication information comprising: a data type to be acquired during a driving process of the vehicle and at least one acquisition condition triggering an acquisition of data corresponding to the data type; and receive, by the server, first data automatically acquired by the vehicle according to the indication information, wherein the first data is data corresponding to the data type;

wherein the indication information is stored in a task table, and the task table has corresponding identification information; and the computer is further enabled to:

receive, by the server, check information sent by the vehicle according to a preset period, wherein the check information is used to determine whether identification information of a first task table of the server is consistent with identification information of a second task table of the vehicle, wherein the first task table is a latest task table; and wherein when the identification information of the first task table is inconsistent with the identification information of the second task table, send, by the server, the first task table to the vehicle;

wherein the first task table and the second task table both comprises at least one data acquisition task;

wherein the indication information further comprises: a weight corresponding to each of the at least one acquisition condition;

wherein at least one data packet is obtained by the vehicle through packaging at least one first data meeting the acquisition condition respectively, and each of the at least one data packet corresponds to its own acquisition condition;

the computer is further enabled to:

when network strength of the vehicle is greater than or equal to a first threshold, receive, by the server, each of the at least one data packet from the vehicle; and when the network strength of the vehicle is less than the first threshold, receive, by the server, the target data packet from the vehicle, wherein the target data packet is determined by the vehicle according to the weight of the acquisition condition corresponding to each of the at least one data packet.

* * * * *